United States Patent [19]
Weiss

[11] Patent Number: 5,592,478
[45] Date of Patent: Jan. 7, 1997

[54] BROADBAND CONFERENCE SYSTEM

[75] Inventor: Manfred Weiss, Neuhausen, Germany

[73] Assignee: Alcatel N.V., Amsterdam, Netherlands

[21] Appl. No.: 292,507

[22] Filed: Aug. 18, 1994

Related U.S. Application Data

[63] Continuation of Ser. No. 869,634, Apr. 16, 1992, abandoned.

[30] Foreign Application Priority Data

Apr. 26, 1991 [EP] European Pat. Off. ............ 91106740

[51] Int. Cl.$^6$ .................................................. H04M 3/56
[52] U.S. Cl. ......................................... 370/260; 379/202
[58] Field of Search ................................. 370/110.1, 62; 379/202, 203, 205, 204, 206; 348/15, 16

[56] References Cited

U.S. PATENT DOCUMENTS

| | | | |
|---|---|---|---|
| 4,723,272 | 2/1988 | Maat | 370/62 |
| 4,847,829 | 7/1989 | Tompkins et al. | 370/62 |
| 4,920,565 | 4/1990 | Strawczynski et al. | 379/202 |
| 4,995,071 | 2/1991 | Weber et al. | 379/53 |
| 5,128,989 | 7/1992 | Nomura | 370/62 |
| 5,373,549 | 12/1994 | Bales et al. | 370/62 |

FOREIGN PATENT DOCUMENTS 0153903  11/1988  European Pat. Off. .

OTHER PUBLICATIONS

"Alcatel ATM Switch Fabric and Its Properties", D. Boettle et al, *Electrical Communication*, vol. 64, No. 2/3, 1990, pp. 156–165.

"End User Premises Equipment and Terminals for Broadband Applications", J. Huelamo et al, *Electrical Communication*, vol. 64, No. 2/3, pp. 205–217.

"Telefonieren von Angesicht zu Angesicht", *Kommunikationstechnik von SEL* Mar. 1988.

*Primary Examiner*—Douglas W. Olms
*Assistant Examiner*—Ajit Patel
*Attorney, Agent, or Firm*—Ware, Fressola, Van Der Sluys & Adolphson

[57] ABSTRACT

A broadband conference system for having a video conference between a number of subscribers (S1, . . . , S3) includes a switching unit (SU) to which those subscribers are coupled and a conference control unit (CCU) also coupled to that switching unit. To establish a conference, a subscriber first sets up a connection to the conference control unit and then transmits thereto the address of a second subscriber involved in the conference. The conference control unit then establishes a connection, over the switching unit, to the second subscriber. In a similar way other subscribers are added to the conference which is controlled and held over the thus established connections.

6 Claims, 4 Drawing Sheets

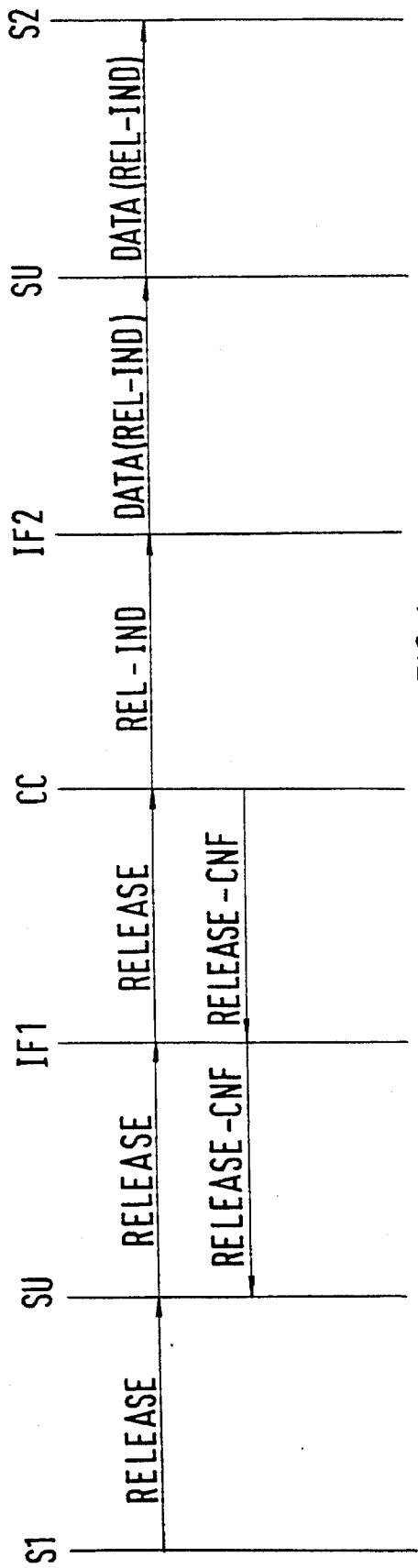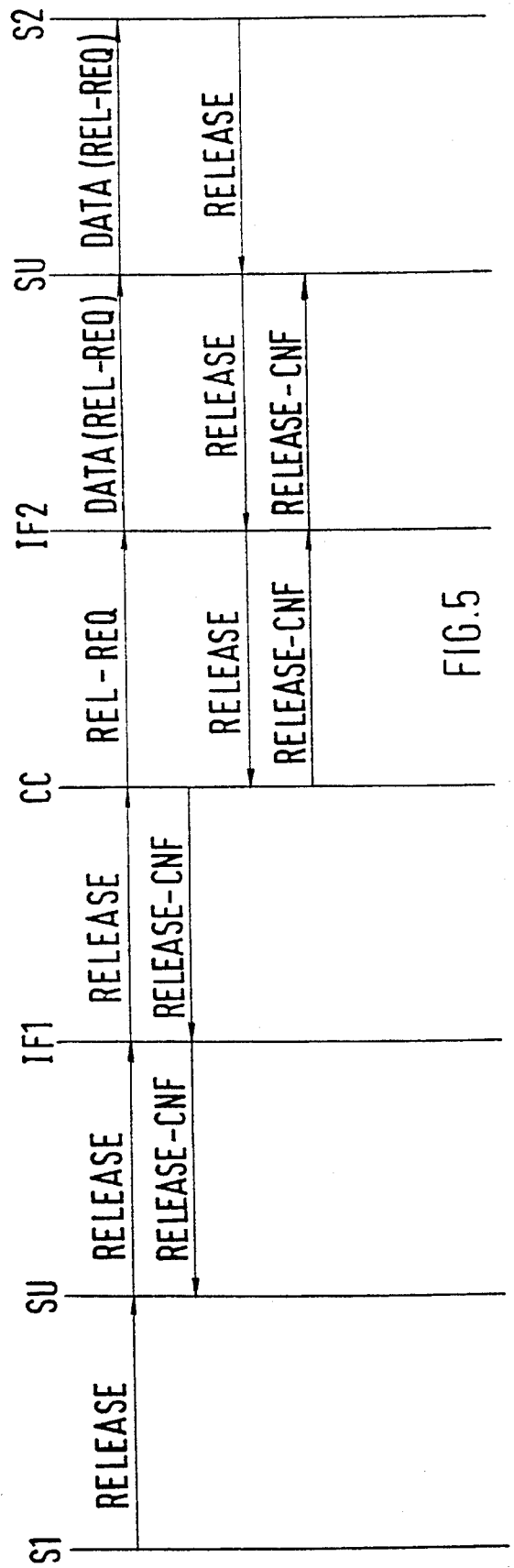

BROADBAND CONFERENCE SYSTEM

This is a continuation of application(s) Ser. No. 07/869,634 filed on Apr. 16, 1992 now abandoned.

TECHNICAL FIELD

The present invention relates to a broadband conference system with n broadband subscribers including a switching unit to which said subcribers are coupled and a conference control unit, to a method for establishing a broadband conference using this broadband conference system and methods for releasing such a conference and disconnecting a subscriber therefrom.

BACKGROUND OF THE INVENTION

Such a conference system is already known in the art e.g., from the published European patent application 153 903 B1. In this known conference system which is a video conference system, image stores and image production controls constitute the above mentioned conference control unit while the mentioned switching unit includes a set of multiplexers. The image stores and production controls as well as the multiplexers are incorporated in a video conference center to which subscribers located at different sites are connected. Groups of image stores and multiplexers are interconnected for the purpose of a conference and the image controls control the storage and reproduction of the images received from/to the different sites participating in the video conference. The thus realised video conference center has to perform switching functions, i.e. interconnection of the above mentioned groups and set up of connections to the different sites involved in a conference, as well as conference control functions. Moreover both functions are linked: to perform the switching functions, the video conference center has to know about the agreed conference parameters. This means that the conference control part of the video conference center can only interwork with a dedicated switching part.

SUMMARY OF THE INVENTION

The object of the invention is to provide a broadband conference system which has a conference control unit able to interwork with any broadband switching unit and to accordingly provide methods for establishing and releasing a broadband conference using this conference system and for disconnecting a subscriber therefrom.

This object is achieved by a broadband conference system with n broadband subscribers including a switching unit to which said subscribers are coupled and a conference control unit, characterized in that said switching unit is a broadband point-to-point switching unit to which said conference control unit is coupled as at least one additional subscriber, said conference control unit including a plurality of interface circuits, each of which is connected via a connection established through said switching unit to at least three of said subscribers involved in a conference, and a conference controller coupled to said interface circuits to control said conference over said connections.

This object is further achieved by a method for establishing a broadband conference between at least three subscribers in a broadband conference system in which said subscribers can communicate with each other by means of a switching unit and a conference control unit connected to said switching unit, said method including the steps of establishing a first connection between a first one of said subscribers and said conference control unit through said switching unit, said first connection being initiated by said first subscriber; said first subscriber transmitting to said conference control unit, over said first connection, the address of a second one of said subscribers; establishing a second connection between said conference control unit and said second subscriber through said switching unit, said second connection being initiated by said conference control unit; either one of said first and second subscriber transmitting to said conference control unit the address of a third one of said subscribers; and establishing a third connection between said conference control unit and said third subscriber, said third connection being initiated by said conference control unit.

This object is still further achieved by a method for releasing a broadband conference between at least three subscribers in a broadband conference system in which said subscribers can communicate with each other by means of a switching unit and a conference control unit connected to said switching unit, said method including the steps of releasing a first connection between a first one of said subscribers and said conference control unit through said switching unit, said release being initiated by said first subscriber; said conference control unit sending to a second and third subscriber a message indicating the request to release the broadband conference; and releasing a second and third connection, between said second and third subscriber respectively and said conference control unit through said switching unit, said release being respectively initiated by said second and third subscribers.

Finally, this object is achieved by a method for disconnecting a subscriber from a broadband conference between at least three subscribers in a broadband conference system in which said subscribers can communicate with each other by means of a switching unit and a conference control unit connected to said switching unit, said method including the steps of releasing a connection through said switching unit between said one subscriber and said conference control unit, said release being initiated by said one subscriber, and said conference control unit informing the remaining subscribers of said conference about said connection release.

Indeed according to the broadband conference system described above for the switching unit, the conference control unit is just an additional subscriber connected via its interface circuits to the other subscribers through the switching unit. All conference control functions are concentrated in the conference control unit and control messages are exchanged between the subscribers and the conference control unit over the above mentioned connections in a transparent way. Consequently, the switching unit is not aware of the conference and has only to perform normal switching functions. This means that any switching unit can be used in the conference system provided that it is a broadband switching unit and that the conference control unit as well as the subscribers use interface protocols known by the switching unit to manage the above mentioned connections. Broadband stands for bit rates of 64 Kbit/s (ISDN) as well as for 140 Mbit/s or for much higher bitrates.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein:

FIG. 3, 4 and 5 represent scenarios for a conference setup, a subscriber disconnect and a conference release respectively.

BEST MODE FOR CARRYING OUT THE INVENTION

Terminology and circuitry commonly used in the domain of video conferencing and broadband communication are not defined or described in detail in the following description. They can be found in general related literature (Electrical Communication, Volume 64, No. 2/3, 1990, published March 1991, End User Premises Equipment and Terminals for Broadband Applications, pp 205).

Figure 1:
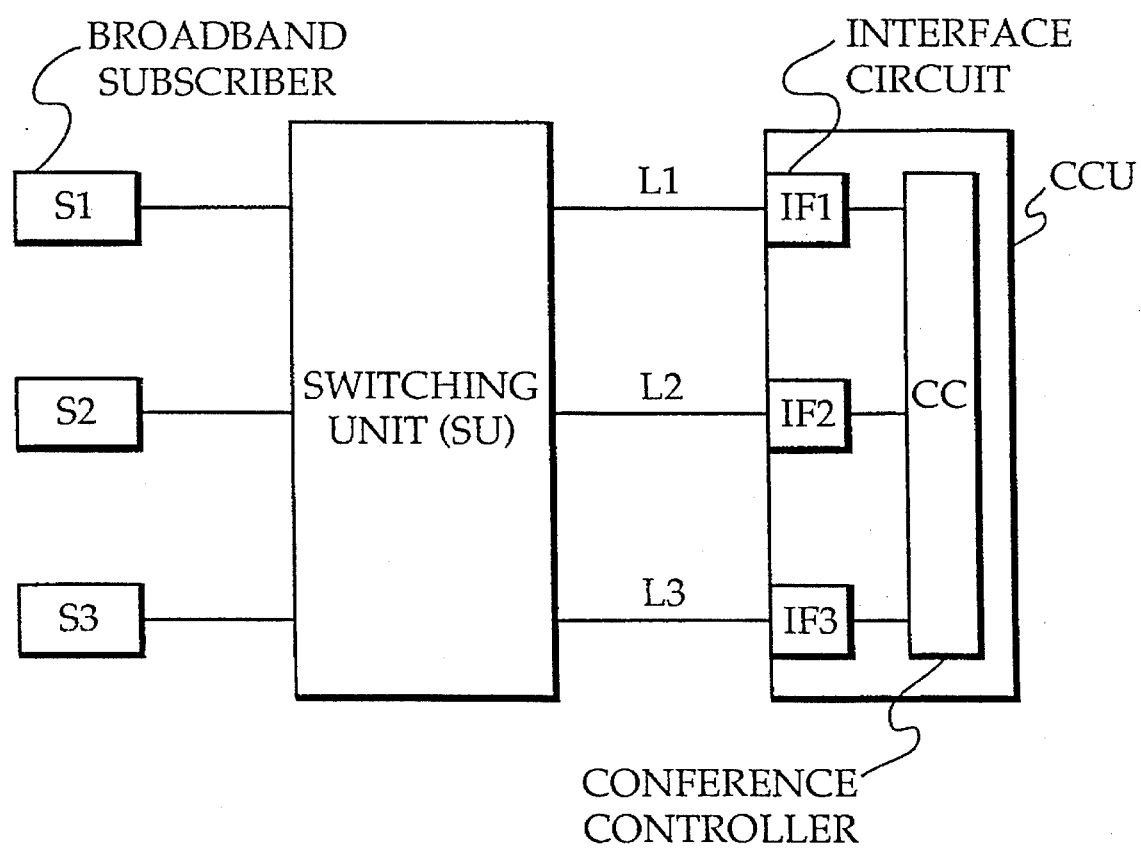
FIG. 1 is a schematic representation of a broadband conference system according to the invention.

FIG. 1 is a schematic representation of a broadband conference system according to the invention. It shows three subscribers S1 to S3 connected to a switching unit SU. A conference control unit CCU is also coupled to the switching unit SU via three links L1 to L3. It consists of three interface circuits IF1 to IF3, coupled to the links L1 to L3 respectively and to a conference controller CC. Each interface circuit is connected to one of the subscribers S1 to S3 over the switching unit SU e.g. IF1 to S1, IF2 to S2 and IF3 to S3. A conference between these subscribers is held via the conference control unit CCU and is controlled by the conference controller CC. A more detailed description of the working of the conference control unit will be given later.

Any broadband subscriber and switching unit can be part of the above described broadband switching system. In the considered embodiment the broadband subscribers S1 to S3 are on desk videophone terminals from Standard Elektrik Lorenz AG (SEL) as described in the brochure "Telefonieren von Angesicht zu Angesicht" distributed at the CeBit '88 conference in Hannover. The switching unit is a well known Asynchronous Transfer Mode switch as e.g. described in the article "Alcatel ATM Switch Fabric and its Properties" from D. Boettle and M. A. Henrion out of the "Electrical Communication" publication, Vol. 64, No. 2/3, 1990.

Figure 2:
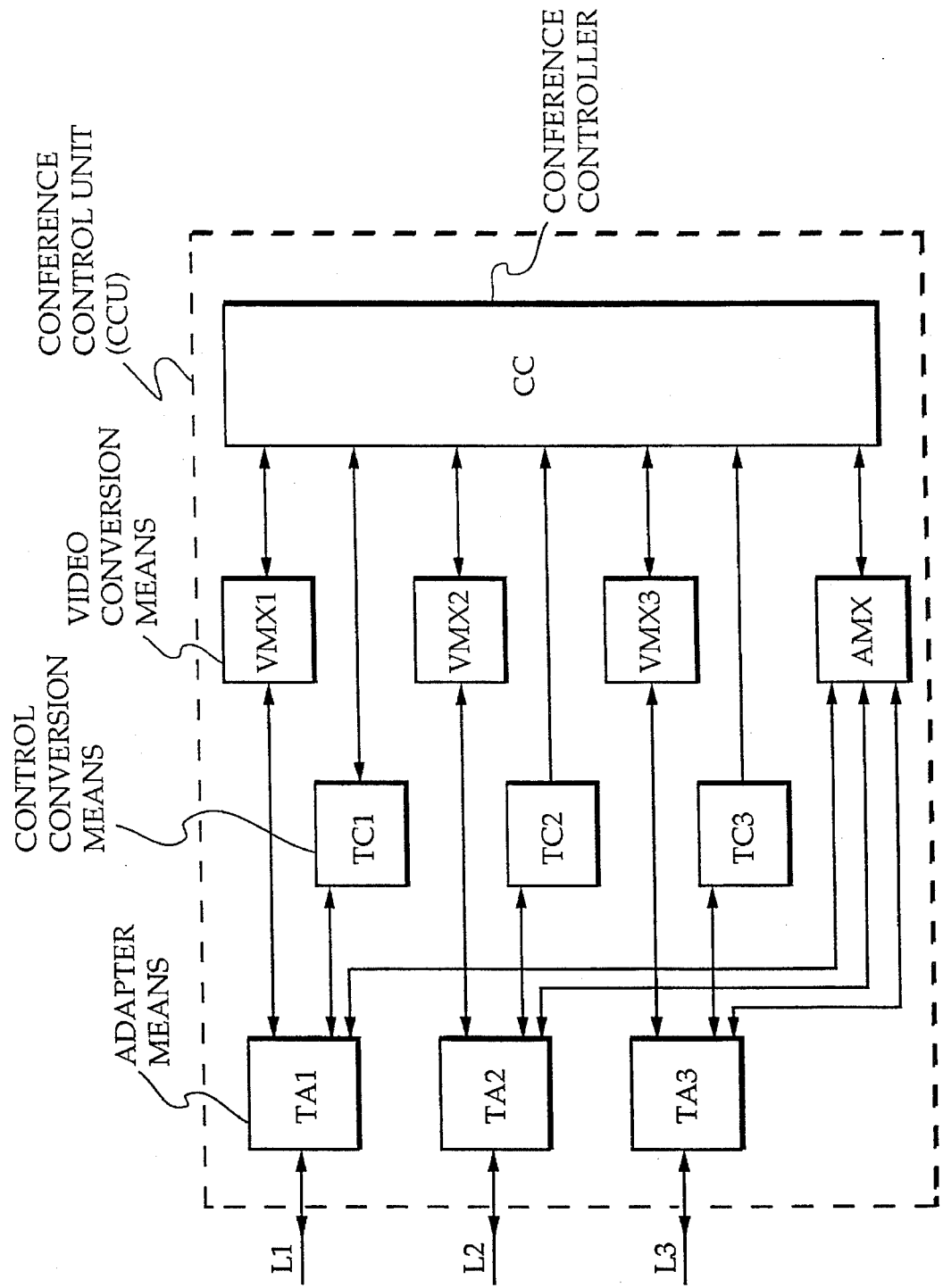
FIG. 2 shows the conference control unit CCU of FIG. 1 in more details.

Referring to FIG. 2 the conference control unit CCU or more particularly its interface circuits IF1 to IF3 are now described in more details. Each of the interface circuits includes e.g. for IF1 adapter means TA1, control conversion means TC1, video conversion means VMX1 and audio conversion means AMX, the latter being common to the three interface circuits IF1 to IF3.

The adapter means TA1 to TA3 are Variable Bit Rate terminal adapters consisting of a video coder/decoder which can operate e.g. from 2 Mbit/s up to 40 Mbit/s, of an audio coder/decoder and a broadband asynchronous multiplexer adapter which processes the digital signals for transmission over the Asynchronous Transfer Mode switch. These terminal adapters TA1 to TA3 are each coupled to the switching unit SU via respective links L1 to L3 using broadband interface circuitry working at e.g. 150 Mbit/s. They are also, via a video interface circuitry, coupled to respective ones of the video conversion means VMX1 to VMX3, which are more specifically video matrix boards, to respective ones of the control conversions TC1 to TC3 using a data inferface circuitry and to the common audio conversion means VMX, being a video matrix board, using audio interface circuitry, to handle mono and stereo signals.

The control conversions means TC1 to TC3 convert the control messages received on their data bus for transmission onto full duplex interface circuitry e.g. a RS232 interface circuit to the conference controller they are connected with and vice versa, while the video matrix boards VMX1 to VMX3 which are mutually interconnected and the audio matrix board AMX are coupled to the conference controller via for example a TTL interface circuit.

The working of the control conversion means TC1 to TC3 and partly of the conference controller CC will now be described by means of the scenarios respresented in FIGS. 3, 4 and 5 which respectively handle a video conference setup using the described broadband conference system, a subscriber disconnect from the conference and a conference release.

Functions, other than conference setup and release, and user disconnect, which are handled by the conference controller CC based on signals received from the video, VMX1 to VMX3, and audio, AMX, matrixes as well as the working of these matrixes are well known in the video conferencing domain and will not be described with relation to the invention.

The scenario's are based on the CCITT Q.931 recommendation for ISDN.

Figure 3:
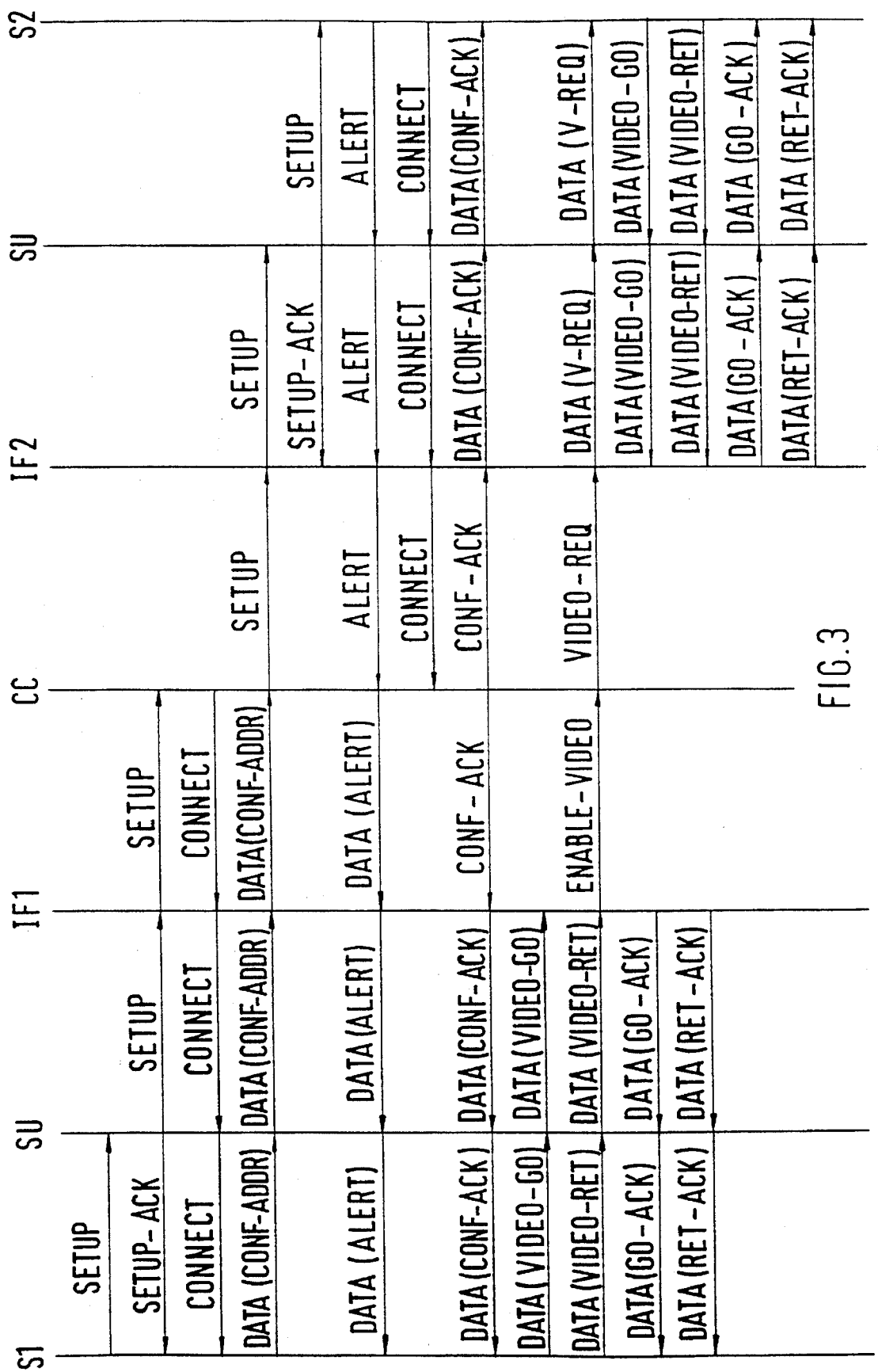

Referring to FIG. 3 a video conference setup between two subscribers S1 and S2 is described. First an audio conference is setup in the following way. Subscriber S1 sets up a connection to the conference control unit CCU by sending a setup message SETUP to the switching unit SU. SU acknowledges the message with the SETUP-ACK message sent to subscriber S1 and sends the message SETUP to the address specified in the received message, i.e. the address of a first interface circuit IF1 which then transmits the message to the conference controller CC. The latter accepts the connection by sending a response message CONNECT to the subscriber S1 via its interface circuit IF1 and the switching unit SU. In this way a first connection, between subscriber S1 and the conference control unit CCU is established. Subscriber S1 then sends over this first connection the address of subscriber S2, with whom he wishes to establish a video conference, by means of a data message DATA (CONF-ADDR). Upon receipt of this address, the conference controller CC sends the setup message SETUP to the switching unit SU via a second interface circuit IF2. SU acknowledges the setup request with the message SETUP-ACK and sends the setup message SETUP to the subscriber S2. Upon receipt S2 sends a message ALERT to the conference controller CC to indicate that a setup request was received.

The conference controller CC passes this indication to subscriber S1 over the first connection in a data message DATA (ALERT). When subscriber S2 accepts the setup message, it sends a message CONNECT to the conference controller CC via the switching unit SU and the interface circuit IF2. From that moment on an audio conference is established between subscriber S1 and S2. This is indicated in a data message DATA (CONF-ACK) sent by the conference controller CC to these subscribers.

To establish a video conference, subscriber S1 enables its go and return video channel and indicates this by sending the data messages DATA (VIDEO-GO) and DATA (VIDEO-RET) to the first interface circuit IF1 over the first connection. IF1 acknowledges these messages with a DATA (GO-ACK) and a DATA (RET-ACK) message and then transmits an ENABLE-VIDEO message to the conference controller CC which enables the corresponding video matrix VMX1 and passes the message further on to subscriber S2 by means of a message VIDEO-REQ to the interface circuit IF2 and a data message DATA (V-REQ) over the second connection. Subscriber S2 on its receipt sends the messages DATA (VIDEO-GO) and DATA (VIDEO-RET) to the interface circuit IF2 which acknowledges these with DATA (GO-ACK) and DATA (RET-ACK) messages.

Either one of the subscribers S1 or S2 can then establish a video conference connection to a third subscriber S3 in the way described above i.e. by sending the address of subscriber S3 to the conference controller CC and by enabling its go and return video channel once the latter has established a connection to S3.

The disconnect of one subscriber from the conference is now described be means of the scenario shown in FIG. 4. The user wanting to disconnect e.g. S1 sends a disconnect message RELEASE to the conference controller CC via the switching unit SU and the interface circuit IF1 over the earlier mentioned first connection. The release is confirmed by the conference controller CC by means of a message RELEASE-CNF sent over that same connection to the switching unit SU and the other subscriber of the conference e.g. S2 are informed of the disconnection by means of a data message DATA (REL-IND) over their corresponding connection.

The conference is released in a way similar to the disconnect described above, and is shown in FIG. 5. One of the users, e.g. S1 asks for the release of the conference by means of the message RELEASE, with parameters indicating a conference release, sent to the conference controller over the earlier mentioned first connection. The release is acknowledged by the latter by the RELEASE-CNF message to the switching unit SU and a request to release the conference is sent to the other subscribers of the conference e.g. S2, This is done by means of a message REL-REQ to the interface circuit IF2 and a data message DATA (REL-REQ) sent over the second connection to S2, If subscriber S2 agrees to release the conference, he sends the release request RELEASE over that second connection to the conference controller CC which acknowledges the release with the message RELEASE-CNF sent to the switching unit SU.

I claim:

1. Broadband conference system with a plurality of broadband subscribers (S1, ..., S3) including a switching unit (SU) to which said plurality of broadband subscribers (S1, ..., S3) are coupled and a conference control unit (CCU), characterized in that said switching unit (SU) is a broadband point-to-point switching unit to which said conference control unit (CCU) is connected as at least one additional subscriber, and said conference control unit (CCU) including:

a plurality of interface circuits (IF1, ..., IF3), each being connected via associated connections established through said switching unit (SU) to said plurality of subscribers involved in a conference, each having means for converting control, video and audio signals to and from a respective one of said plurality of broadband subscribers (S1, ..., S3), and a conference controller (CC) coupled to said interface circuits (IF1, ..., IF3) for performing all conference control functions for said conference over said associated connections, and for providing the control, video, and audio signals to and from said plurality of interface circuits (IF1, ..., IF3).

2. Broadband conference system according to claim 1 wherein said interface circuits (IF1, ..., IF3) each include adapter means (TA1, ..., TA3) for coding and decoding broadband signals that are sent and received over said associated connections;

control conversion means (TC1, ..., TC3) connected to said adapter means (TA1, ..., TA3) and to said conference controller (CC) to convert control signals which are part of said broadband signals into a predetermined format;

video conversion means (VMX1, ..., VMX3) connected to said adapter means (TA1, ..., TA3) and to said conference controller (CC) to convert video signals which are part of said broadband signals into a predetermined format; and audio conversion means (AMX) connected to said adapter means (TA1, ..., TA3) and to said conference controller (CC) to convert audio signals which are part of said broadband signals into a predetermined format.

3. Broadband conference system according to claim 2 wherein said audio conversion means (AMX) are common to all said interface circuits (IF1, ..., IF3).

4. A method for establishing a broadband conference between at least three subscribers (S1, S2, S3). in a broadband conference system in which said at least three subscribers can communicate with each other by means of a switching unit (SU) to which a conference control unit (CCU) is connected as an additional subscriber, said method including the steps of establishing a first connection between a first one of said at least three subscribers (S1, S2, S3) and said conference control unit (CCU) through said switching unit (SU), said first connection being initiated by said first subscriber;

said first subscriber transmitting to said conference control unit (CCU) and over said first connection the address of a second one of said at least three subscribers (S1, S2, S3);

establishing a second connection between said conference control unit (CCU) and said second subscriber through said switching unit (SU), said second connection being initiated by said conference control unit (CCU);

either one of said first and second subscriber transmitting to said conference control unit (CCU) the address of a third one of said at least three subscribers (S1, S2, S3); and establishing a third connection between said conference control unit (CCU) and said third subscriber, said third connection being initiated by said conference control unit (CCU).

5. A method for releasing a broadband conference between at least three subscribers in a broadband conference system in which said at least three subscribers (S1, S2, S3) can communicate with each other by means of a switching unit (SU) to which a conference control unit (CCU) is connected as an additional subscriber, said method including the steps of releasing a first connection between a first one of said at least three subscribers (S1, S2, S3) and said conference control unit (CCU) through said switching unit (SU), said release being initiated by said first subscriber;

said conference control unit (CCU) sending to second and third subscribers a message indicating a request to release said broadband conference;

releasing a second and third connection, between said second and third subscribers respectively and said conference control unit (CCU) through said switching unit (SU), said releasing being initiated by said second and third subscribers respectively.

6. A method for disconnecting one subscriber of at least three subscribers from a broadband conference between said at least three subscribers (S1, S2, S3) in a broadband conference system in which said at least three subscribers can communicate with each other by means of associated connections over a switching unit (SU) to which a conference control unit (CCU) is connected as an additional subscriber, said method including the steps of:

disconnecting one connection of said associated connections through said switching unit (SU) between said one subscriber and said conference control unit (CCU), said disconnection being initiated by said one subscriber, and informing with said conference control unit (CCU) all remaining subscribers of said at least three subscribers (S1, S2, S3) that said one subscriber is being disconnected.

* * * * *

UNITED STATES PATENT AND TRADEMARK OFFICE
CERTIFICATE OF CORRECTION

PATENT NO. : 5,592,478
DATED : January 7, 1997
INVENTOR(S) : Manfred Weiss

It is certified that error appears in the above-indentified patent and that said Letters Patent is hereby corrected as shown below:

At col. 6, line 24, after "(S1, S2, S3)", delete ".".

Signed and Sealed this

Twenty-ninth Day of April, 1997

Attest:

BRUCE LEHMAN

Attesting Officer

Commissioner of Patents and Trademarks